(12) United States Patent
Boer et al.

(10) Patent No.: US 9,325,532 B2
(45) Date of Patent: Apr. 26, 2016

(54) METHOD AND APPARATUS FOR COMMUNICATING SYMBOLS IN A MULTIPLE INPUT MULTIPLE OUTPUT COMMUNICATION SYSTEM USING INTERLEAVED SUBCARRIERS ACROSS A PLURALITY OF ANTENNAS

(75) Inventors: Jan Boer, Odijik (NL); Bas Driesen, Dongen (NL); Tim Schenk, Eindhoven (NL); Allert Van Zelst, Woerden (NL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 2970 days.

(21) Appl. No.: 10/562,618

(22) PCT Filed: Jun. 30, 2004

(86) PCT No.: PCT/US2004/021029
§ 371 (c)(1),
(2), (4) Date: May 15, 2006

(87) PCT Pub. No.: WO2005/006701
PCT Pub. Date: Jan. 20, 2005

(65) Prior Publication Data
US 2007/0060073 A1    Mar. 15, 2007

Related U.S. Application Data

(60) Provisional application No. 60/483,719, filed on Jun. 30, 2003.

(51) Int. Cl.
*H04M 1/00* (2006.01)
*H04L 25/02* (2006.01)
(Continued)

(52) U.S. Cl.
CPC .......... *H04L 25/0232* (2013.01); *H04B 7/0617* (2013.01); *H04L 5/0023* (2013.01);
(Continued)

(58) Field of Classification Search
CPC . H04L 5/0023; H04L 5/0048; H04L 25/0204; H04L 2025/03414; H04L 27/2602; H04L 27/2675; H04L 27/2601; H04L 25/0228; H04L 25/0242; H04L 27/2647; H04L 27/2657; H04L 5/0044; H04L 1/0054; H04L 29/06

USPC ......... 370/334, 203, 208, 210, 342, 329, 338; 375/267, 260, 299, 347, 316, 340, 130; 455/101, 562.1, 103, 132, 501, 67.13, 455/450, 452.1, 500, 102; 342/373, 428, 342/432

See application file for complete search history.

(56) References Cited

U.S. PATENT DOCUMENTS 6,473,467 B1   10/2002   Wallace et al.
6,473,468 B1   10/2002   Do
(Continued)

FOREIGN PATENT DOCUMENTS

WO    WO 03/034642    4/2003

OTHER PUBLICATIONS

P.W. Wolniansky, G.J. Foschini, G.D. Golden, R.A. Valenzuela; V-Blast: An Architecture for Realizing Very High Data Rates Over the Rich-Scattering Wireless Channel. Date not available (reference provided by applicant).*

(Continued)

*Primary Examiner* — Fred Casca

(57) ABSTRACT

A method and apparatus are provided for transmitting one or more symbols in a multiple antenna wireless communication system. Subcarriers from one or more symbols are interleaved across a plurality of antennas. The symbols may be, for example, long or short training symbols based on a single-antenna long or short training symbol, respectively, and wherein each subsequent subcarrier from the single-antenna training symbol is positioned in a training symbol for a logically adjacent antenna. One or more additional subcarriers may be inserted in at least one of the plurality of symbols to allow nulled subcarriers to be estimated using an interpolation-based channel estimation technique. The remaining portions of a header, as well as the data sequences of a packet, may also be diagonally loaded.

29 Claims, 5 Drawing Sheets

(51) Int. Cl.
  *H04W 16/28* (2009.01)
  *H04B 7/06* (2006.01)
  *H04W 16/24* (2009.01)
  *H04L 5/00* (2006.01)
  *H04B 7/04* (2006.01)

(52) U.S. Cl.
  CPC .......... *H04L5/0048* (2013.01); *H04L 25/0204* (2013.01); *H04L 25/0226* (2013.01); *H04W 16/24* (2013.01); *H04W 16/28* (2013.01); *H04B 7/0413* (2013.01)

(56) References Cited

U.S. PATENT DOCUMENTS

| | | | |
|---|---|---|---|
| 7,352,688 B1* | 4/2008 | Perahia et al. | 370/206 |
| 7,408,976 B1* | 8/2008 | Narasimhan et al. | 375/148 |
| 7,606,316 B1* | 10/2009 | Narasimhan | 375/260 |
| 2004/0022174 A1* | 2/2004 | Li et al. | 370/203 |
| 2004/0042556 A1* | 3/2004 | Medvedev et al. | 375/260 |
| 2004/0120411 A1* | 6/2004 | Walton et al. | 375/260 |
| 2004/0131011 A1* | 7/2004 | Sandell et al. | 370/210 |
| 2004/0141548 A1* | 7/2004 | Shattil | 375/146 |
| 2004/0208253 A1* | 10/2004 | Joo | 375/260 |
| 2007/0064586 A1* | 3/2007 | Ma et al. | 370/203 |
| 2007/0223364 A1* | 9/2007 | Terabe et al. | 370/208 |

OTHER PUBLICATIONS

Shin et al., "A New Training Symbol Structure to Enhance the Peformance of Channel Estimation for MIMO-OFDM Systems," IEEE International Conference on Acoustics, Speech, and Signal Processing Proceedings (ICASSP), Vol. 1 of 6, pp. IV397-IV400 (Apr. 6, 2003).

Sun et al., "Training Sequence Assisted Channel Estimation for MIMO OFDM," Wireless Communications and Networking, pp. 38-43 (Mar. 16, 2003).

Ostuni F S et al., Layered space-time codes with iterative receiver and space-time soft-output decoding in a rayleigh fading environment, Personal, Indoor and Mobile Radio Communications, 2002, The 13th IEEE International Symposium on Sep. 15-18, 2002, Piscataway, NJ, USA, IEEE, vol. 1, Sep. 15, 2002, pp. 418-422.

Da-Shan Shiu et al., Layered space-time codes for wireless communications using multiple transmit antennas, ICC '99, 1999 IEEE International Conference on Communications, Conference Record, Vancouver, CA, Jun. 6-10, 1999, IEEE International Conference on Communications, New York, NY: IEEE, US, Jun. 6, 1999, pp. 436-440.

* cited by examiner $$\mathbf{t}_l = [01-1-111-11-11-1-1-1-1-111-1-11-11-111110\cdots$$
$$\cdots 011-1-111-11-1111111-1-111-11-11111]$$

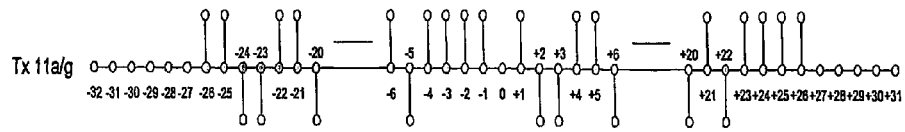
FIG. 3
PRIOR ART
$$t_l^1 = \begin{bmatrix} 0 & 1 & 0 & 0 & 1 & 0 & 0 & 1 & 0 & 0 & -1 & 0 & 0 & -1 & 0 & \cdots \end{bmatrix}$$
$$t_l^2 = \begin{bmatrix} 0 & 0 & -1 & 0 & 0 & 1 & 0 & 0 & -1 & 0 & 0 & -1 & 0 & 0 & -1 & \cdots \end{bmatrix}$$
$$t_l^3 = \begin{bmatrix} 0 & 0 & 0 & -1 & 0 & 0 & -1 & 0 & 0 & 1 & 0 & 0 & -1 & 0 & 0 & \cdots \end{bmatrix}$$
FIG. 4
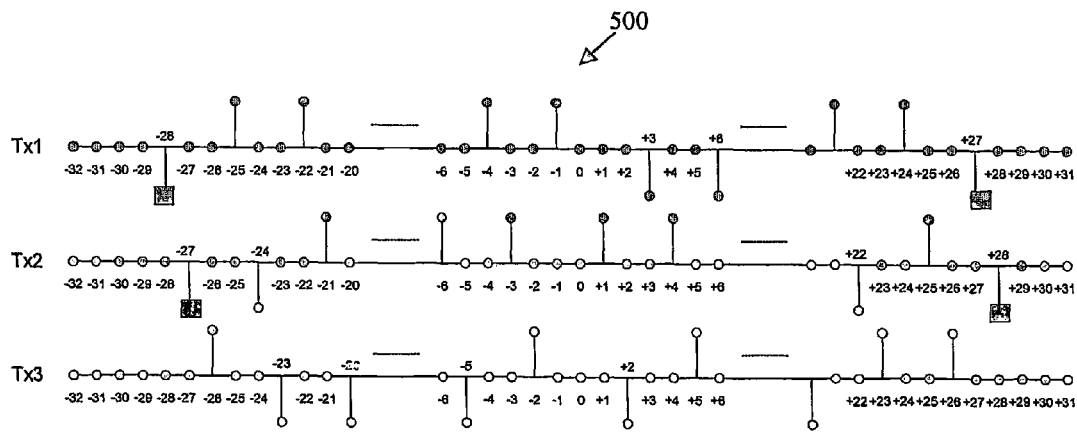
FIG. 5

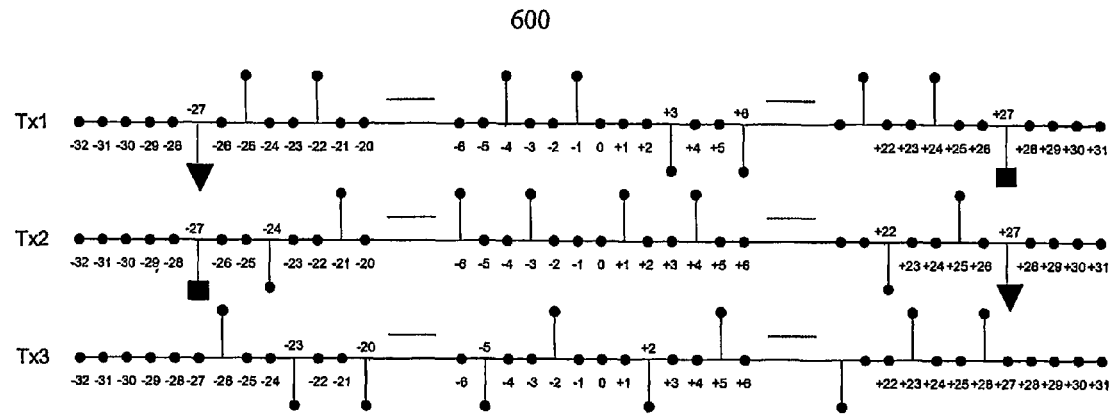
FIG. 6
$$\begin{array}{c} T_x^1 \\ T_x^2 \\ T_x^3 \end{array} \begin{bmatrix} 1 & 0 & 0 & 1 & 0 & 0 & 1 & \cdots & 0 & 0 & 1 \\ 0 & 1 & 0 & 0 & 1 & 0 & 0 & \cdots & 1 & 0 & 0 \\ 0 & 0 & 1 & 0 & 0 & 1 & 0 & \cdots & 0 & 1 & 0 \end{bmatrix}$$
$$R_x \begin{bmatrix} H_1^1 & H_2^2 & H_3^3 & H_4^1 & H_5^2 & H_6^3 & H_7^1 & \cdots & H_{50}^2 & H_{51}^3 & H_{52}^1 \end{bmatrix}$$
FIG. 7
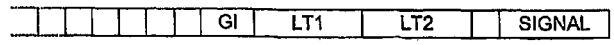
FIG. 8
PRIOR ART

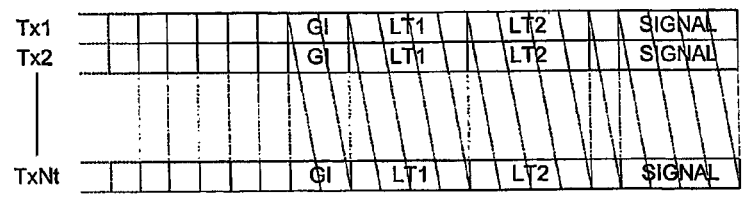
FIG. 9
$$T_x^1 \begin{bmatrix} 1 & 0 & 1 & 0 & 1 & 0 & 1 & \cdots & 0 & 1 & 0 \\ 0 & 1 & 0 & 1 & 0 & 1 & 0 & \cdots & 1 & 0 & 1 \end{bmatrix}$$
$$R_x^1 \begin{bmatrix} H_1^1 & 0 & 0 & H_4^2 & 0 & 0 & H_7^1 & \cdots & 0 & 0 & H_{52}^2 \\ 0 & H_2^2 & 0 & 0 & H_5^1 & 0 & 0 & \cdots & H_{50}^2 & 0 & 0 \\ 0 & 0 & H_3^1 & 0 & 0 & H_6^2 & 0 & \cdots & 0 & H_{51}^1 & 0 \end{bmatrix}$$
FIG. 10
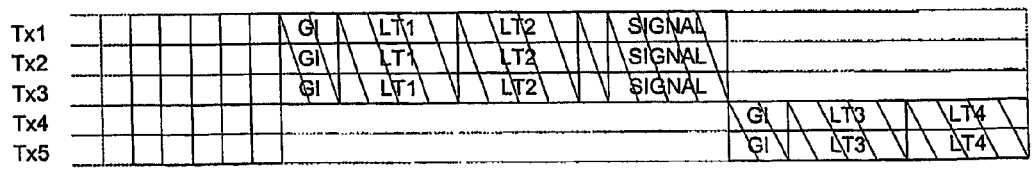
FIG. 11

METHOD AND APPARATUS FOR COMMUNICATING SYMBOLS IN A MULTIPLE INPUT MULTIPLE OUTPUT COMMUNICATION SYSTEM USING INTERLEAVED SUBCARRIERS ACROSS A PLURALITY OF ANTENNAS

CROSS REFERENCE TO RELATED APPLICATIONS

This application claims the benefit of U.S. Provisional Application No. 60/483,719, filed Jun. 30, 2003, incorporated by reference herein. The present application is also related to United States Patent Application, entitled "Methods and Apparatus for Backwards Compatible Communication in a Multiple Input Multiple Output Communication System with Lower Order Receivers," filed contemporaneously herewith and incorporated by reference herein.

FIELD OF THE INVENTION

The present invention relates generally to channel estimation techniques for a wireless communication system, and more particularly, to channel estimation techniques for a Multiple Input Multiple Output Orthogonal Frequency Division Multiplexing (OFDM) communication system.

BACKGROUND OF THE INVENTION

Most existing Wireless Local Area Network (WLAN) systems based upon OFDM modulation comply with the IEEE 802.11a/g standard. See, e.g., IEEE Std 802.11a-1999, "Part 11: Wireless LAN Medium Access Control (MAC) and Physical Layer (PHY) Specification: High-Speed Physical Layer in the Five GHz Band," incorporated by reference herein. In order to support evolving applications, such as multiple high-definition television channels, WLAN systems must be able to support ever increasing data rates. Accordingly, next generation WLAN systems should provide increased robustness and capacity.

Multiple transmit and receive antennas have been proposed to provide both increased robustness and capacity. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques.

A MIMO-OFDM system transmits separate data streams on multiple transmit antennas, and each receiver receives a combination of these data streams on multiple receive antennas. The difficulty, however, is in distinguishing between and properly receiving the different data streams at the receiver. A variety of MIMO-OFDM decoding techniques are known, but they generally rely on the availability of accurate channel estimations. For a detailed discussion of MIMO-OFDM decoding techniques, see, for example, P. W. Wolniansky at al., "V-Blast: An Architecture for Realizing Very High Data Rates Over the Rich-Scattering Wireless Channel," 1998 URSI International Symposium on Signals, Systems, and Electronics (September 1998), incorporated by reference herein.

In order to properly receive the different data streams, MIMO-OFDM receivers must acquire a channel matrix through training. This is generally achieved by using a specific training symbol, or preamble, to perform synchronization and channel estimation techniques. The training symbol increases the total overhead of the system. In addition, a MIMO-OFDM system needs to estimate a total of $N_t N_T$ channels, where $N_t$ is the number of transmitters and $N_T$ is the number of receivers, which could lead to an $N_t$ increase of the long training length when, for each transmitter, two original 802.11a/g long training symbols are transmitted repeated in time.

A need therefore exists for a length-efficient training symbol. A further need exists for a training symbol having a minimum length, preferably equal to the length of a training symbol in a conventional Single Input Single Output OFDM (SISO-OFDM) system. Yet another need exists for a method and system for performing channel estimation and training in a MIMO-OFDM system utilizing a signal that is orthogonal in the frequency domain or equally shift orthogonal in the time domain. A further need exists for a method and system for performing channel estimation and training in a MIMO-OFDM system that is compatible with current IEEE 802.11a/g standard (SISO) systems.

SUMMARY OF THE INVENTION

Generally, a method and apparatus are disclosed for transmitting one or more symbols in a multiple antenna wireless communication system. Subcarriers from one or more symbols are interleaved, such as diagonally loaded, across a plurality of antennas. The symbols may be, for example, long or short training symbols based on a single-antenna long or short training symbol, respectively, and wherein each subsequent subcarrier from the single-antenna training symbol is positioned in a training symbol for a logically adjacent antenna.

One or more additional subcarriers may be inserted in at least one of the plurality of symbols, for example, to ensure that any subcarrier that was nulled by the diagonal loading is surrounded by subcarriers that are not nulled. The one or more additional subcarriers allow nulled subcarriers to be estimated using an interpolation-based channel estimation technique. The remaining portions of a header, as well as the data sequences of a packet, may also be diagonally loaded.

A more complete understanding of the present invention, as well as further features and advantages of the present invention, will be obtained by reference to the following detailed description and drawings.

BRIEF DESCRIPTION OF THE DRAWINGS

FIG. 3 illustrates a frequency domain representation of a conventional IEEE 802.11a/g long training symbol;

FIG. 4 illustrates long training symbols incorporating features of the present invention for a MIMO-OFDM system having three transmit antennas;

FIG. 5 illustrates a frequency domain representation of a MIMO-OFDM long training symbol in accordance with a first embodiment of the invention;

FIG. 6 illustrates a frequency domain representation of a MIMO-OFDM long training symbol in accordance with a second embodiment of the invention;

FIG. 7 illustrates the subcarriers for three exemplary transmit antennas when a data sequence of all ones is transmitted in accordance with the diagonal loading techniques of the present invention;

FIG. 8 illustrates a conventional IEEE 802.11a/g preamble structure;

FIG. 9 illustrates a MIMO-OFDM preamble structure incorporating features of the present invention;

FIG. 10 provides an example of scalability in accordance with the present invention for a MIMO-OFDM system employing two transmit antennas and three receiver antennas;

FIG. 11 illustrates an exemplary MIMO-OFDM preamble structure for a system with five transmit antennas.

DETAILED DESCRIPTION

The present invention recognizes that the most efficient training of a MIMO-OFDM system is a signal that is orthogonal in the frequency domain or equally shift orthogonal in the time domain. This is intuitively understood since, in the time domain, if the training signal would not be orthogonal, then the Channel State Information (CSI) for a single path cannot be separated from the other paths. Furthermore, if the training signal is not shift orthogonal, then the CSI of a single path cannot be correctly obtained since the delayed training signals of the other paths are not orthogonal to this one. (Delayed versions of the training signal are received because of the effects of multipath, which is caused by reflections in the environment.)

Figures 1, 2:
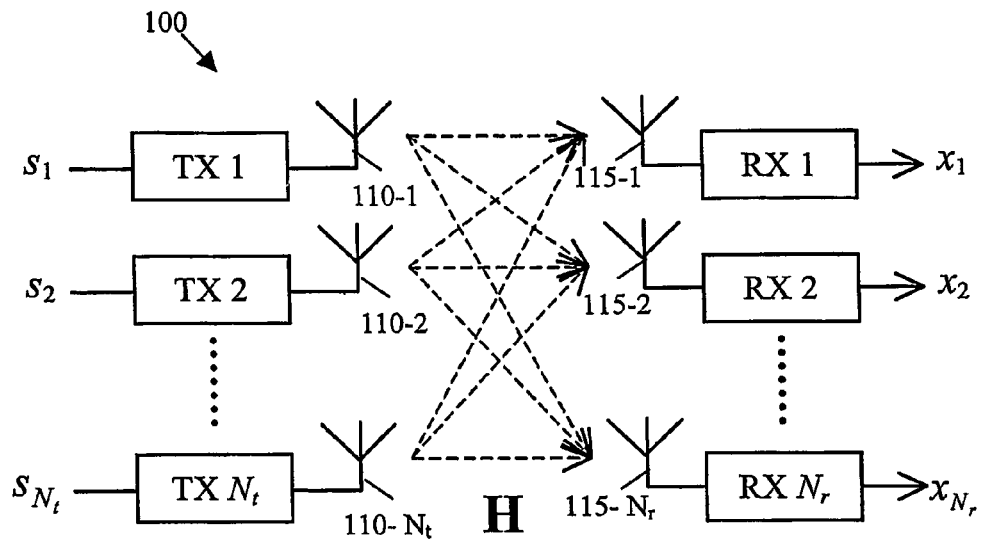
FIG. 1 illustrates a conventional MIMO-OFDM system consisting of $N_t$ transmitters, $N_r$ receivers.
FIG. 2 illustrates a conventional long training symbol according to the IEEE 802.11a/g standard consisting of 64 subcarriers, seen at the input of the Inverse Fast Fourier Transform (IFFT)

FIG. 1 illustrates an exemplary MIMO-OFDM system 100 comprising source signals $S_1$ to $S_{N_t}$, transmitters $TX_1$ to $TX_{N_t}$, transmit antennas 110-1 through 110-$N_t$, receive antennas 115-1 through 115-$N_r$, and receivers $RX_1$ to $RX_{N_r}$. The MIMO-OFDM system 100 transmits separate data streams on the multiple transmit antennas 110, and each receiver RX receives a combination of these data streams. In order to extract and detect the different data streams $S_1$ to $S_{N_t}$, the MIMO-OFDM receivers RX must acquire the channel matrix, H, as shown in FIG. 1, through training.

The IEEE 802.11a/g standard specifies a preamble in the frequency domain for OFDM-based Wireless Local Area Network systems consisting of short and long training symbols. The short training symbols are for frame detection, Automatic Gain Control (AGC) and coarse synchronization. The long training symbols are used for fine synchronization and channel estimation. The long training symbol according to the IEEE 802.11a/g standard consists of 64 subcarriers and is specified as shown in FIG. 2.

FIG. 3 illustrates a frequency domain representation of the IEEE 802.11a/g long training symbol of FIG. 2. The present invention recognizes that since only 52 of the 64 subcarriers in the long training symbol are modulated, there are additional subcarriers available to accommodate channel estimation techniques for a MIMO-OFDM system.

As previously indicated, the ideal training symbol for a MIMO-OFDM system is orthogonal in the frequency domain or equally shift orthogonal in the time domain. According to one aspect of the present invention, the long training symbol of the IEEE 802.11a/g standard is made orthogonal by diagonally loading the modulated subcarriers on the different transmit antennas. The diagonal loading of subcarriers may also be referred to as subcarrier interleaving or multiplexing the subcarriers across the transmitters. It is noted that the diagonally loading techniques described here for long training symbols, also apply to short training symbols to overcome possible beamforming effects, as would be apparent to a person of ordinary skill in the art.

FIG. 4 illustrates long training symbols for a MIMO-OFDM system in accordance with the present invention, where the subcarriers from the training symbol of FIG. 3 are diagonally loaded across three exemplary transmit antennas. FIG. 4 illustrates the first 16 subcarriers seen at the input of the Inverse Fast Fourier Transform (IFFT) for each of three antennas, $t_l^1$ through $t_l^3$, where $t_l^n$ stands for the long training symbol transmitted on the n-th transmit antenna. In the example shown in FIG. 4, each subsequent subcarrier is transmitted on an adjacent antenna in a round robin fashion. Thus, only one-third of the subcarriers are transmitted on each antenna and the remaining subcarriers are nulled.

The channel estimates associated with the nulled carriers on each antenna created by the diagonal loading can be obtained at the receiver using a form of interpolation. In particular, the channel estimates belonging to the nulled subcarriers of a specific transmit antenna can be obtained through interpolation by utilizing neighboring subcarriers that are not nulled. Generally, as long as the root-mean-square (RMS) time delay spread (IDS) of the channel is limited or, equally, the coherence bandwidth is larger than a number that depends on the actual number of transmitters used, the channel estimation error due to interpolation will in general be small.

As indicated above, when subcarriers are diagonally loaded on multiple transmit antennas in accordance with the present invention, however, additional subcarriers become nulled on each transmit antenna. As a result, the outer subcarriers of the spectrum defined by the OFDM system (FIG. 3) no longer have neighboring subcarriers. For example, when subcarriers −26 and −25 in the conventional long training symbol of FIG. 3 are diagonally loaded on multiple transmit antennas (TX3 and TX1, respectively), in a manner described below in conjunction with FIG. 5, the subcarrier −26 is nulled on transmit antennas 1 and 2, and the subcarrier −25 is nulled on transmit antennas 2 and 3. Thus, on antenna 1, subcarrier −26 no longer has at least one subcarrier on each side that is not nulled.

If the outer subcarriers in the conventional long training symbol of FIG. 3 are nulled as part of the diagonal loading on multiple transmit antennas and do not have at least one subcarrier on each side that are not nulled, they cannot be interpolated, but must be extrapolated. Extrapolation, however, creates larger errors than interpolation, and a larger error in the channel estimation of the outer subcarriers impairs the performance of the system.

Thus, according to another aspect of the invention, a diagonally loaded long training symbol, based on the IEEE 802.11a training symbol of FIG. 3, is utilized in conjunction with one or more additional subcarriers at the edge of the spectrum. The additional subcarriers are positioned in the spectrum to ensure that all subcarriers that are nulled for diagonal loading have at least one subcarrier on each side that is not nulled. As noted above, since the training technique defined by the IEEE 802.11a/g standard only modulates 52 out of the 64 subcarriers, additional spectrum is available to specify additional subcarriers.

For example, it can be shown that the addition of four extra training subcarriers, two at each side of the spectrum, conforms with the IEEE 802.11a/g transmit mask defined in the IEEE 11a/g standard. A MIMO-OFDM 100 system with two transmit antennas employs two extra subcarriers, one at each side of the spectrum, and a MIMO-OFDM system with three transmit antennas can employ four extra subcarriers, two at each side of the spectrum, in order to ensure that all nulled subcarriers of the original system have at least one subcarrier located on each side that is not nulled and thereby enabling the interpolation of the original subcarriers positioned at the edges of the spectrum. Thus, the additional subcarriers at the edges of the spectrum overcome the problem of extrapolation and enable an interpolation-based channel estimation technique.

FIG. 5 is a schematic diagram of exemplary MIMO-OFDM long training symbols 500 in accordance with the present invention for a three transmit antenna system, with additional subcarriers positioned at the spectrum's edges (+27 and −28 on $TX_1$; +28 and −27 on $TX_2$) to provide neighboring subcarriers to the nulled subcarriers (+26 and −26 of $TX_1$ and $TX_2$). $TX_3$ does not require additional subcarriers since the outer subcarriers (+26 and −26) are not null. The extra subcarriers at the edges are modulated in such a way that the peak-to-average power ratio (PAP) is lowest to minimize the effect of non-linearity of the power amplifiers. The original subcarriers associated with the original IEEE 802.11a training symbol of FIG. 3 have round arrowheads and the additional subcarriers added in accordance with the present invention are illustrated in FIG. 5 with square arrowheads.

The exemplary MIMO-OFDM long training symbols 500 shown in FIG. 5 provide an optimal solution for a three transmit antenna MIMO-OFDM system 100, with four additional subcarriers (two on each side of the spectrum) to be able to make an accurate estimation of the outer subcarriers on each antenna. The first long training symbol and the second long training symbol of each antenna would, in this case, be identical.

FIG. 6 is a schematic diagram of exemplary MIMO-OFDM long training symbols 600 in accordance with an alternate embodiment of the present invention for a three transmit antenna system. The long training symbols 600 shown in FIG. 6 include just two additional subcarriers (+27 on TX1 and −27 on TX2). The embodiment of FIG. 6 recognizes that each IEEE 802.11a/g preamble includes two long training symbols, LT1 and LT2, as discussed further below in conjunction with FIG. 8. The embodiment shown in FIG. 6 uses just two additional subcarriers, but interchanges the additional subcarriers at the first and the second long training symbols LT1 and LT2. In the exemplary embodiment of FIG. 6, the first long training symbol LT1 uses the outer subcarriers (−27 of TX2 and +27 of TX1) and the second long training symbol uses the outer subcarriers (−27 of TX1 and +27 of TX2). In the notation of FIG. 6, the subcarriers associated with the original IEEE 802.11a training symbol of FIG. 3 have round arrowheads, the additional subcarriers active for the first long training symbol LT1 are illustrated with square arrowheads and the additional subcarriers that are active for the second long training symbol LT2 are illustrated in FIG. 6 with triangle arrowheads.

Thus, the first long training symbol LT1 provides neighboring subcarriers to nulled subcarrier −26 of $TX_2$ and +26 of $TX_1$ and the second long training symbol LT2 will provide neighboring subcarriers to nulled subcarrier +26 of $TX_2$ and −26 of $TX_1$. These nulled subcarriers, however, would have a less accurate channel estimate since only one of the two training symbols are providing a neighboring subcarrier and, thus, the signal-to-noise ratio (SNR) or the mean squared error (MSE) of the channel estimate will be lower respectively higher than in the case of the other subcarriers.

Backwards Compatibility

A MIMO-OFDM system preferably needs to be backwards compatible to the current IEEE 802.11a/g standard in order to coexist with existing systems. The diagonally loaded long training symbols disclosed herein are backwards compatible and can coexist with IEEE 802.11a/g systems and MIMO-OFDM systems of other orders (i.e., comprising a different number of transmitters). As used herein, backwards compatibility means that a MIMO-OFDM system needs to be able to (i) support the current standards; and (ii) defer (standby) for the duration of a MIMO-OFDM transmission. Any system with $N_r$ receive antennas that is not able to receive the data transmitted is able to defer for the duration of the transmission since it is able to detect the start of the transmission and retrieve the length (duration) of this transmission.

A MIMO-OFDM system 100 employing the diagonally loaded long training symbols disclosed herein can communicate in a backwards-compatible way with an IEEE 802.11a/g system in two ways. First, it is possible to scale back to one antenna to transmit data according to the IEEE 802.11a/g standard. In addition, a MIMO-OFDM system which uses diagonally loaded long training symbols can diagonally load the rest of the header and the data symbols on the different transmit antennas. In this case, the IEEE 802.11a/g receiver is able to interpret the MIMO transmission from all the active transmitters as a normal OFDM frame. In other words, an IEEE 802.11a/g receiver can interpret a MIMO transmission of data, if such data is transmitted using the same diagonal loading technique described above for training symbols.

FIG. 7 illustrates the subcarriers for three exemplary transmit antennas $T_x^1$ to $T_x^3$ when a data sequence of all ones is transmitted in accordance with the present invention, where $H_n^t$ represents the channel coefficient belonging to the n-th subcarrier and the t-th transmitter. In this case, the receiver $R_x$ processes the received signal as the channel coefficients belonging to a single channel, even though the different channel coefficients belong to different actual channel realizations. Each active transmit antenna transmits a portion of the total transmission to the IEEE 802.11a/g receiver.

FIG. 8 illustrates a conventional IEEE 802.11a/g preamble structure 800 and FIG. 9 illustrates a MIMO-OFDM preamble structure 900 incorporating features of the present invention. As shown in FIGS. 8 and 9, LT1 and LT2 are the long training symbols, respectively, and SIGNAL is the SIGNAL-field.

If an IEEE 802.11a/g system is unable to receive a MIMO-OFDM transmission, the IEEE 802.11a/g receiver will need to defer (standby) for the duration of a MIMO-OFDM packet. Thus, in order to be backwards compatible, the IEEE 802.11a/g-based receivers need to be able to detect the preamble employed by the present invention and interpret the SIGNAL-field of the packet to be able to extract the length of the packet. The preamble employed by the present invention can be made backwards compatible with current IEEE 802.11a/g-based systems by diagonally loading the SIGNAL-field on the different transmit antennas. As described above, the IEEE 802.11a/g receiver then receives a preamble of which portions of the subcarriers originate from the different transmit antennas. The length specified in the SIGNAL-field for a MIMO-OFDM transmission should be set equal to the actual duration of the packet, so that the IEEE 802.11a/g-based receive can read the packet length and defer for the duration of the MIMO-OFDM transmission.

A MIMO-OFDM system also needs to be able to translate the SIGNAL-field into the actual length of the packet in bytes. For this to occur, a MIMO-OFDM system must have additional information of the system, such as the number of antennas. This additional information can be included in the reserved bit in the SIGNAL-field and in the additional subcarriers (when the SIGNAL-field is also appended with extra subcarriers). In addition, if the length at the transmitter is defined to be in line with the number of OFDM symbols in the MIMO-OFDM case, then some freedom remains.

By specifying the duration in number of OFDM symbols, the amount of data can only be coarsely specified in multiples of the number of transmitter OFDM symbols. In a three transmitter MIMO-OFDM system, for example, the data contained in the specified duration is equal to a multiple of three OFDM symbols. However the data does not need to be exactly in line with a multiple of number of transmitters OFDM symbols. The data may span, for example, only the final OFDM symbol of the first transmitter, leaving the other final OFDM symbols of the remaining two transmitters empty. Furthermore, the data may span only part of the final OFDM symbol of the first transmitter. The latter one can still be specified using the additional freedom that is left in specifying the duration of a MIMO-OFDM message, since the specified length does not need to be specified in exactly multiple of OFDM symbols.

The final OFDM symbol might instead be specified in number of contained data bytes, which will result in a duration equal to a whole number of OFDM symbols. The number of final OFDM symbols left empty needs to be additionally specified and is referred to as padding OFDM symbols. In a three transmit MIMO-OFDM system, the number of OFDM padding symbols can be one or two. The padding symbols in a MIMO-OFDM transmission could be specified using additional subcarriers in the SIGNAL-field, similar to the long training symbols or they could be specified using the reserved bits in the SERVICE-field.

Additionally, the number of bytes contained in the final data OFDM symbol can be specified, which inherently specifies the number of padding bits in this symbol. However, a MIMO-OFDM transmission can also contain padding symbols and, since these symbols cannot be extracted from the LENGTH and RATE-field, they should instead be additionally specified.

Furthermore, a MIMO-OFDM system employing diagonally loaded long training symbols and SIGNAL-field can be made scalable to different MIMO-OFDM configurations. For example, a MIMO-OFDM system with three transmit antennas can easily be scaled back to a MIMO-OFDM system with two transmit antennas. Additionally, a MIMO-OFDM system with only two receive antennas can train the channel and interpret the SIGNAL-field of a MIMO-OFDM transmission with three transmit antennas, and therefore is able to defer for the duration of the packet (similar to the technique above for the IEEE 802.11a/g receiver). A MIMO-OFDM system can thus coexist with an IEEE 802.11a/g system and lower order MIMO-OFDM systems.

A MIMO-OFDM system employing diagonally loaded long training symbols must know the number of transmit antennas beforehand to be scaleable, since the number of transmit antennas provides an indication to the MIMO-OFDM receiver of which channel coefficient belongs to which transmit antenna. FIG. 10 provides an example for a MIMO-OFDM system employing two transmit antennas $T_x^1$ and $T_x^2$ and three receiver antennas $R_x^1$, $R_x^2$ and $R_x^3$, here only $R_x^1$ is depicted. Once the receiver knows the antenna configuration of the transmitter, the receiver can reorder the coefficients and estimate the corresponding channels.

A diagonally loaded SIGNAL-field, however, can be detected and decoded even without knowing the number of transmit antennas. The SIGNAL-field will be of even better quality than the receive data since every receive antenna receives the same data and this can be combined using Maximum-Ratio Combining (MRC) techniques.

In a further variation, the SIGNAL-field can include information (with the use of extra subcarriers) indicating the number of transmit antennas and the number of OFDM padding symbols to the receiver. As previously indicated, for a 2×2 MIMO-OFDM system, two additional subcarriers are needed and, for a 3×3 MIMO-OFDM system, four additional subcarriers are needed to be able to sufficiently estimate the nulled subcarriers at the edges of the spectrum. Two extra subcarriers result in two extra available bits and four extra subcarriers means four extra available bits.

As indicated above, the reserved bit in the SIGNAL-field can be used to specify the type of system (i.e., either a SISO-OFDM or a MIMO-OFDM system). The first extra bit resulting from the additional subcarriers can be used to distinguish between two and three transmit antennas. The second extra bit can be used to specify the number of OFDM padding symbols (the options are one or two padding symbols for three transmitters). As these two extra bits cannot be encoded with the original SIGNAL-field, they are less robust than the other SIGNAL-field bits. The two remaining bits, however, can then be used to add extra robustness by implementing a one-error correcting block code. The two remaining bits could also be used for additional specification information, such as that needed when a higher order MIMO-OFDM system is considered. It is also useful to note that when a similar frame structure is adopted for MIMO-OFDM systems as for IEEE 802.11a/g systems, then more information can be stored in the reserved bits of the SERVICE-field.

A positive property of the diagonally loaded SIGNAL-field is the fact that it actually serves as a third long training symbol. Since after decoding and demodulation, the exact bits of the SIGNAL-field are known, they can then be used to train the channel. The SIGNAL-field in a SISO-OFDM system is always modulated and encoded in the same robust way using BPSK modulation and rate ½ convolutional encoding, which facilitates good reception. The SIGNAL-field in a MIMO-OFDM transmission is even more robust, since the SIGNAL-field is received by multiple antennas and thus can be combined in an optimal way. The use of the SIGNAL-field as a third long training symbol is therefore a feasible solution.

It should be noted, however, that the decoding of the SIGNAL-field takes time and increases the latency when used for channel estimation. When latency becomes a problem, a first channel estimate can be based on the two long training symbols and can be updated afterwards. Furthermore, when backwards compatibility and scalability are not of importance, the SIGNAL-field can instead be shift-diagonally loaded, as it does not need to serve frequency-offset estimation. It can be shown that shift-diagonally loading the training symbols and SIGNAL-field yields the best performance (see, B. Driesen, "MIMO OFDM Channel Estimation", Design Note, OSDN10A, 2003). With shift-diagonally loaded training symbols, the inherent interpolation error becomes smaller when each symbol is first processed separately and afterwards combined.

Additionally, it should be noted that when the training symbols are repeated on each antenna, they all should be able to transmit full power. With diagonally loaded training symbols, it is only necessary to be able to transmit them with power/Nt, resulting in less expensive power amplifiers (PAs). Furthermore, it is possible to transmit with additional power since the limiting factor most of the time is not the output power specified in the regulations, but that the PA itself cannot achieve these high output powers without distortion. This is a direct result of the technology utilized for the PA design.

FIG. 11 illustrates an exemplary MIMO-OFDM preamble structure 1100 for a system with five transmit antennas $T_x^1$ through $T_x^5$, where LT1 and LT2 are the long training symbols and SIGNAL is the SIGNAL-field. With diagonally loaded long training symbols and SIGNAL-field, a 3×3 MIMO- OFDM can be realized in the manner described above. Higher order MIMO-OFDM systems need extra training to make accurate channel estimation possible. Generally, one additional training symbol is needed for each additional transmit antenna. An exemplary 5×5 MIMO-OFDM system would therefore require four long training symbols and a SIGNAL-field. The channels belonging to the first three transmit antennas are estimated with the first two long training symbols and the SIGNAL-field, and the channels corresponding to the last two transmitters are estimated with the last two long training symbols.

Figure 12:
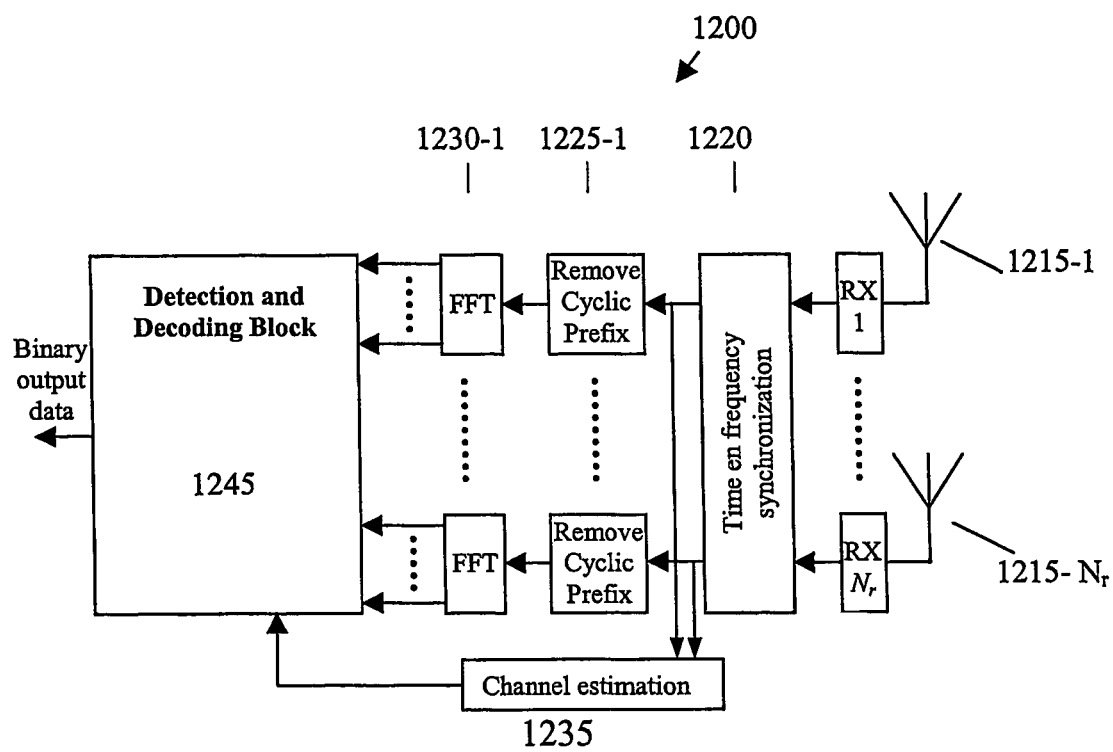
FIG. 12 is a block diagram of an exemplary MIMO-OFDM receiver in accordance with the present invention.

FIG. 12 is a block diagram of an exemplary MIMO-OFDM receiver 1200 incorporating features of the present invention. As shown in FIG. 12, the MIMO-OFDM receiver 1200 includes a plurality of receive antennas 1215-1 through 1215-$N_r$, and receivers $RX_1$ to $RX_{N_r}$. Time and frequency synchronization is performed at stage 1220, and the synchronized received signal is applied to stage 1225 that removes the cyclic prefix and a channel estimation stage 1235. Once the cyclic prefix is removed at stage 1225, a fast fourier transform (FFT) is performed at stage 1230. A detection and decoding block 1245 performs MIMO detection (for $N_c$ subcarriers), phase drift and amplitude droop correction, demapping, deinterleaving, depuncturing and decoding, using the channel estimate 1235.

If the MIMO-OFDM receiver 1200 must be backwards-compatible, the MIMO-OFDM receiver 1200 can perform channel estimation 1235 with equally diagonally loaded training symbols and SIGNAL-field as follows:
1. add two long training symbols to gain in SNR;
2. transform the resulting long training symbol to the frequency domain;
3. demodulate the long training symbol, resulting in incomplete channel estimates;
4. transform the SIGNAL-field to the frequency domain;
5. detect and decode the SIGNAL-field using the incomplete channel estimates;
6. demodulate the SIGNAL-field to generate another estimate of the incomplete channels;
7. sum and scale the demodulated SIGNAL-field and the demodulated training symbol (sum the incomplete channel estimates); and
8. compute the complete channel estimates through interpolation between the known subcarriers.

If the MIMO-OFDM receiver 1200 does not need to be backwards-compatible, the MIMO-OFDM receiver 1200 can perform channel estimation 1235 with shift-diagonally loaded training symbols and SIGNAL-field as follows:
1. transform the long training symbols and SIGNAL-field to the frequency domain;
2. demodulate the long training symbols;
3. perform separate interpolation of the long training symbols;
4. sum and scale the interpolated long training symbols;
5. detect and decode the SIGNAL-field;
6. demodulate the SIGNAL-field;
7. interpolate the SIGNAL-field; and
8. update channel estimates by combining the interpolated SIGNAL-field and training symbols.

It is to be understood that the embodiments and variations shown and described herein are merely illustrative of the principles of this invention and that various modifications may be implemented by those skilled in the art without departing from the scope and spirit of the invention.

We claim:

1. A method for transmitting one or more symbols in a multiple antenna wireless communication system, said method comprising the step of:
diagonally loading, utilizing one or more processors of said multiple antenna wireless communication system, subcarriers from said one or more symbols across a plurality of antennas in said multiple antenna wireless communication system, wherein said one or more symbols include at least one of:
long training symbols based on a single-antenna long training symbol, wherein each subsequent subcarrier from said single-antenna long training symbol is positioned in a long training symbol for a logically adjacent antenna; and
short training symbols based on a single-antenna short training symbol, wherein each subsequent subcarrier from said single-antenna short training symbol is positioned in a short training symbol for a logically adjacent antenna;
wherein a reduced number of subcarriers are inserted in said at least one of said plurality of long training symbols and wherein a first long training symbol and a second long training symbol are interchanged to position at least one non-nulled subcarrier on at least one side of a nulled subcarrier.

2. The method of claim 1, wherein said single-antenna long training symbol is an 802.11 a/g long training symbol.

3. The method of claim 1, wherein said single antenna short training symbol is an 802.11 a/g short training symbol.

4. The method of claim 1, wherein said multiple antenna wireless communication system is a MIMO-OFDM system.

5. The method of claim 1, further comprising the step of inserting one or more additional subcarriers in at least one of said plurality of symbols.

6. The method of claim 5, where said one or more additional subcarriers are inserted to ensure that any subcarrier that was nulled by said diagonal loading is surrounded by subcarriers that are not nulled.

7. The method of claim 5, where said one or more additional subcarriers allow nulled subcarriers to be estimated using an interpolation-based channel estimation technique.

8. The method of claim 1, wherein said one or more symbols are a SIGNAL-field symbol.

9. The method of claim 8, wherein said SIGNAL-field symbol includes a system type indicator.

10. The method of claim 1, wherein a number of said long training symbols is a function of the number of transmitters.

11. The method of claim 1, further comprising the steps of: diagonally loading a remainder of a header of a packet across said logically adjacent antennas; and diagonally loading data sequences of said packet across said logically adjacent antennas.

12. The method of claim 1, wherein said plurality of antennas are logically adjacent.

13. The method of claim 1, whereby a lower order receiver can interpret said transmitted diagonally loaded symbols as a normal OFDM frame.

14. A method for generating a plurality of long training symbols in a multiple antenna wireless communication system, said method comprising the step of:
diagonally loading, utilizing one or more processors of said multiple antenna wireless communication system, subcarriers from a single-antenna long training symbol across long training symbols associated with logically adjacent antennas in said multiple antenna wireless communication system, wherein each subsequent subcarrier from said single-antenna long training symbol is positioned in a long training symbol for a logically adjacent antenna;

nulling subcarriers in said plurality of long training symbols that are not diagonally loaded, utilizing said one or more processors of said multiple antenna wireless communication system; and inserting at least one additional subcarrier, utilizing said one or more processors of said multiple antenna wireless communication system, to ensure that a nulled subcarrier has at least one subcarrier located on each side of said nulled subcarrier, wherein said one or more additional inserted subcarriers ensures that any subcarrier that was nulled by being diagonally loaded is surrounded by subcarriers that are not nulled.

15. The method of claim 14, wherein said single-antenna long training symbol is an 802.11 a/g long training symbol.

16. The method of claim 14, where said at least one additional subcarrier allows nulled subcarriers to be estimated using an interpolation-based channel estimation technique.

17. The method of claim 14, wherein a reduced number of subcarriers are inserted in at least one of said plurality of long training symbols and wherein a first long training symbol and a second long training symbol are interchanged to position at least one non-nulled subcarrier on at least one side of a nulled subcarrier.

18. A transmitter in a multiple antenna wireless communication system, comprising:
a plurality of transmit antennas,
wherein subcarriers of one or more symbols are diagonally loaded across logically adjacent antennas of said plurality of transmit antennas, said one or more symbols being long training symbols based on a single-antenna long training symbol, and each subsequent subcarrier from said single-antenna long training symbol being positioned in a long training symbol for a logically adjacent antenna,
wherein a remainder of a header of a packet and data sequences of said packet are diagonally loaded across said logically adjacent antennas, and
wherein one or more additional subcarriers are inserted in at least one of said one or more symbols, said one or more additional subcarriers being inserted to ensure that any subcarrier that was nulled by being diagonally loaded is surrounded by subcarriers that are not nulled.

19. The transmitter of claim 18, wherein said multiple antenna wireless communication system is a MIMO-OFDM system.

20. The transmitter of claim 18, wherein said one or more symbols are a SIGNAL-field symbol.

21. The transmitter of claim 18, wherein:
a remainder of a header of a packet are diagonally loaded across said logically adjacent antennas; and
data sequences of said packet are diagonally loaded across said logically adjacent antennas.

22. A method for transmitting one or more symbols in a multiple antenna wireless communication system, said method comprising the steps of:
diagonally loading, utilizing one or more processors of said multiple antenna wireless communication system, subcarriers from said one or more symbols across a plurality of logically adjacent antennas in said multiple antenna wireless communication system;
diagonally loading, utilizing said one or more processors of said multiple antenna wireless communication system, a remainder of a header of a packet across said plurality of logically adjacent antennas; and
diagonally loading, utilizing said one or more processors of said multiple antenna wireless communication system, data sequences of said packet across said plurality of logically adjacent antennas;
wherein one or more additional subcarriers are inserted in at least one of said one or more symbols, said one or more additional subcarriers being inserted to ensure that any subcarrier that was nulled by being diagonally loaded is surrounded by subcarriers that are not nulled.

23. The method of claim 22, further comprising: transmitting said subcarriers from said one or more symbols using said plurality of logically adjacent antennas in said multiple antenna wireless communication system such that each of said subcarriers are active on only one of said plurality of logically adjacent antennas at a given time.

24. A transmitter in a multiple antenna wireless communication system, comprising:
a plurality of transmit antennas for transmitting subcarriers from one or more symbols,
wherein said subcarriers from said one or more symbols are diagonally loaded across said plurality of antennas, wherein a remainder of a header of a packet is diagonally loaded across logically adjacent antennas of said plurality of transmit antennas, and data sequences of said packet are diagonally loaded across said logically adjacent antennas, and
wherein one or more additional subcarriers are inserted in at least one of said one or more symbols, said one or more additional subcarriers being inserted to ensure that any subcarrier that was nulled by being diagonally loaded is surrounded by subcarriers that are not nulled.

25. The transmitter of claim 24, wherein
said subcarriers are transmitted such that each of said subcarriers are active on only one of said plurality of antennas at a given time.

26. A method for receiving one or more symbols on at least one receive antenna transmitted by a transmitter having a plurality of transmit antennas in a multiple antenna wireless communication system, said method comprising the step of:
aggregating, utilizing one or more processors of said multiple antenna wireless communication system, subcarriers from said one or more symbols that were transmitted such that each of said subcarriers are active on only one of said plurality of antennas at a given time, wherein said subcarriers are diagonally loaded across a plurality of logically adjacent antennas of said plurality of antennas, and wherein said one or more symbols include at least one of: a long training symbol based on a single-antenna long training symbol and a short training symbol based on a single-antenna short training symbol;
wherein one or more additional subcarriers are inserted in at least one of said one or more symbols, said one or more additional subcarriers being inserted to ensure that any subcarrier that was nulled by being diagonally loaded is surrounded by subcarriers that are not nulled.

27. The method of claim 26, wherein said one or more symbols include at least one of
long training symbols based on a single-antenna long training symbol, wherein each subsequent subcarrier from said single-antenna long training symbol is positioned in a long training symbol for a logically adjacent antenna; and
short training symbols based on a single-antenna short training symbol, wherein each subsequent subcarrier from said single-antenna short training symbol is positioned in a short training symbol for a logically adjacent antenna.

28. A receiver in a multiple antenna wireless communication system having at least one transmitter having a plurality of transmit antennas, comprising:

at least one receive antenna; and an aggregator for aggregating subcarriers from one or more symbols that were transmitted such that each of said subcarriers are active on only one of said plurality of antennas at a given time, wherein said subcarriers are diagonally loaded across a plurality of logically adjacent antennas of said plurality of antennas, wherein one or more additional subcarriers are inserted in at least one of said one or more symbols, said one or more additional subcarriers being inserted to ensure that any subcarrier that was nulled by being diagonally loaded is surrounded by subcarriers that are not nulled, and wherein said one or more symbols include at least one of: a long training symbol based on a single-antenna long training symbol and a short training symbol based on a single-antenna short training symbol.

29. The receiver of claim 28, wherein said one or more symbols include at least one of:

long training symbols based on a single-antenna long training symbol, wherein each subsequent subcarrier from said single-antenna long training symbol is positioned in a long training symbol for a logically adjacent antenna; and short training symbols based on a single-antenna short training symbol, wherein each subsequent subcarrier from said single-antenna short training symbol is positioned in a short training symbol for a logically adjacent antenna.

* * * * *